United States Patent
MacDougall et al.

(10) Patent No.: US 9,342,493 B2
(45) Date of Patent: May 17, 2016

(54) TRANSIENT, REAL-TIME POSITION TRACKING INTERFACE FOR USER ACTIVITY IN A DOCUMENT EDITING APPLICATION

(75) Inventors: Thomas A. MacDougall, Kanata (CA); Mohammed Mostafa, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 13/368,029

(22) Filed: Feb. 7, 2012

(65) Prior Publication Data

US 2013/0205203 A1    Aug. 8, 2013

(51) Int. Cl.
*G06F 17/00*     (2006.01)
*G06F 17/24*     (2006.01)

(52) U.S. Cl.
CPC .............. *G06F 17/24* (2013.01); *G06F 17/241* (2013.01)

(58) Field of Classification Search
CPC ..................................................... G06F 17/241
USPC ................................. 715/200, 230, 231, 232
See application file for complete search history.

(56) References Cited

U.S. PATENT DOCUMENTS

| | | | |
|---|---|---|---|
| 4,739,468 A * | 4/1988 | Fujimoto | 700/86 |
| 5,623,588 A * | 4/1997 | Gould | 715/787 |
| 5,768,607 A * | 6/1998 | Drews et al. | 715/203 |
| 6,950,984 B2 | 9/2005 | Hori et al. | |
| 7,496,841 B2 | 2/2009 | Hadfield et al. | |
| 7,739,622 B2 | 6/2010 | DeLine et al. | |
| 8,010,894 B2 | 8/2011 | Merrill et al. | |

(Continued)

FOREIGN PATENT DOCUMENTS

EP     1083492 A2     3/2001

OTHER PUBLICATIONS

Tam, J. and Greenberg, S. (In Press—Accepted May 2005) "A Framework for Asynchronous Change Awareness in Collaborative Documents and Workspaces", International Journal of Human Computer Studies, Elsevier, 29 pgs.

(Continued)

*Primary Examiner* — Stephen Hong
*Assistant Examiner* — Gregory J Vaughn
(74) *Attorney, Agent, or Firm* — Shumaker & Sieffert, P.A.

(57) ABSTRACT

An example method includes receiving a first input indicating user activity at a first position in a document in a document editing application. The document editing application is navigable among different partial views of the document. The document editing application displays a frame element that indicates a position of a presently displayed partial view of the document is with reference to an entirety of the document. The method further includes displaying, in response to the first input indicating user activity, a first marker, in or proximate to the frame element, indicating where the first position of user activity is located with reference to the entirety of the document.

17 Claims, 7 Drawing Sheets

(56) References Cited

U.S. PATENT DOCUMENTS

| | | | |
|---|---|---|---|
| 2002/0093496 A1* | 7/2002 | Gould | 345/204 |
| 2003/0070139 A1* | 4/2003 | Marshall et al. | 715/512 |
| 2004/0054296 A1* | 3/2004 | Ramseth | 600/509 |
| 2010/0058166 A1* | 3/2010 | Chikyu | 715/230 |
| 2011/0209052 A1 | 8/2011 | Parker et al. | |
| 2011/0289404 A1* | 11/2011 | Fleur | G06F 17/241 715/255 |
| 2012/0047434 A1* | 2/2012 | Ginetti | G06F 17/24 715/255 |
| 2012/0117089 A1* | 5/2012 | Matrat et al. | 707/752 |
| 2012/0143590 A1* | 6/2012 | Ajima | 704/2 |
| 2012/0233254 A1* | 9/2012 | Koizuka | 709/204 |
| 2014/0033294 A1* | 1/2014 | Swineford et al. | 726/12 |

OTHER PUBLICATIONS

Chevalier et al. "Using Text Animated Transitions to Support Navigation in Document Histories", CHI 2010, Apr. 1015, 2010, Atlanta Georgia, US, ACM, 10 pgs.

* cited by examiner

10B

```
simpleCode.java  X                                    72
296          total += string.charAt(i);
297      }
298      return total;
299   }
300   /**                              1. Edit text on line 70
301    * This is simple code to demonstrate the markers in the gutter.
302    */
303   public static void simpleCodeRun() {
304
305       // Print hello world
306       string helloworld = " Hello world";
307
308       System.out.println(helloworld);
309
310       // Print numbers 1 to 1000
311       for (int i = 1; i <= 1000; i++) {
312           System.out.println(i);
313       }
314
315       // Print perfect squares
316       for (int j = 1; j <= 1000; j++) {
317           // TODO
318           // I can still use regular markers in addition to the
319           // edit or navigation markers
320           System.out.println(j*j);
321       }
322
323       // Print cubes
324       for (in j2 = 1; j2 <= 1000; j2++) {
325           // TODO
326           // I can still use regular markers in addition to the
327           // edit or navigation markers
328           System.out.println(j2*j2*j2);
329       }
330
331   }
332
333   public static void main(String[] args) {
334       simpleCodeRun();
335   }
```

```
10C simpleCode.java    X
296        total += string.charAt(i);
297      }
298      return total;
299   }
300   /**
301    * This is simple code to demonstrate the markers in the gutter.
302    */
303   public static void simpleCodeRun() {
304
305      // Print hello world
306      String helloworld = " Hello world";
307
308      System.out.println(helloworld);
309
310      // Print numbers 1 to 1000
311      for (int i = 1; i <= 1000; i++) {
312         System.out.println(i);
313      }
314
315      // Print perfect squares
316      for (int j = 1; j <= 1000; j++) {
317         // TODO
318         // I can still use regular markers in addition to the
319         // edit or navigation markers
320         System.out.println(j*j);
321      }
322
323      // Print cubes
324      for (in j2 = 1; j2 <= 1000; j2++) {
325         // TODO
326         // I can still use regular markers in addition to the
327         // edit or navigation markers
328         System.out.println(j2*j2*j2);
329      }
330
331   }
332
333   public static void main(String[] args) {
334      simpleCodeRun();
335   }
```

FIG. 4

TRANSIENT, REAL-TIME POSITION TRACKING INTERFACE FOR USER ACTIVITY IN A DOCUMENT EDITING APPLICATION

TECHNICAL FIELD

The disclosure relates to document editing environments, and in particular, to user interface elements for computer-based document editing applications.

BACKGROUND

Computer users such as software developers, writers, attorneys, scientists, students, etc. often use computers to write and edit long computer programs or documents. Users may use a text editor application for writing and editing computer programs, a word processing application for writing and editing documents, or a specialized editor application for writing and editing desktop publishing documents or scientific papers, for example. A user often scrolls or skips back and forth among different positions in a source code document, word processing document, or other type of document to write or make edits in different positions in the document.

SUMMARY

In one example, a method includes receiving a first input indicating user activity at a first position in a document in a document editing application. The document editing application is navigable among different partial views of the document. The document editing application displays a frame element that indicates a position of a presently displayed partial view of the document is with reference to an entirety of the document. The method further includes displaying, in response to the first input indicating user activity, a first marker, in or proximate to the frame element, indicating where the first position of user activity is located with reference to the entirety of the document.

In another example, a computing system includes one or more processors, one or more computer-readable tangible storage devices, and a display device. The computing system also includes program instructions, stored on at least one of the one or more computer-readable tangible storage devices for execution by at least one of the one or more processors, to receive a first edit to the document at a first position in a document in a document editing application, wherein the document editing application is navigable among different partial views of the document, and the document editing application displays a frame element that indicates a position of a presently displayed partial view of the document on the display device with reference to an entirety of the document. The computing system also includes program instructions, stored on at least one of the one or more computer-readable tangible storage devices for execution by at least one of the one or more processors, to display on the display device, in response to the first edit to the document, a first marker, in or proximate to the frame element, indicating where the first position of the first edit is located with reference to the entirety of the document. The computing system also includes program instructions, stored on at least one of the one or more computer-readable tangible storage devices for execution by at least one of the one or more processors, to receive additional edits to the document including an nth edit to the document, wherein each of the additional edits is at an additional position in the document in the document editing application. The computing system also includes program instructions, stored on at least one of the one or more computer-readable tangible storage devices for execution by at least one of the one or more processors, to display, in response to the additional edits to the document, additional markers, in or proximate to the frame element on the display device, indicating where the additional positions of the additional edits are located with reference to the entirety of the document, wherein each of the additional markers are visually distinct from each other. The computing system also includes program instructions, stored on at least one of the one or more computer-readable tangible storage devices for execution by at least one of the one or more processors, to remove the first marker in response to the nth edit to the document.

In another example, a computer program product includes one or more computer-readable tangible storage media and program instructions stored on at least one of the one or more computer-readable tangible storage media. The computer program product includes program instructions, stored on at least one of the one or more computer-readable tangible storage media, to receive a first edit to the document at a first position in a document in a document editing application, wherein the document editing application is navigable among different partial views of the document, and the document editing application displays a frame element that indicates a position of a presently displayed partial view of the document with reference to an entirety of the document. The computer program product also includes program instructions, stored on at least one of the one or more computer-readable tangible data storage media, to display, in response to the first edit to the document, a first marker, in or proximate to the frame element, indicating where the first position of user activity is located with reference to the entirety of the document. The computer program product also includes program instructions, stored on at least one of the one or more computer-readable tangible data storage media, to receive additional edits to the document including an nth edit to the document, wherein each of the additional edits is at an additional position in the document in the document editing application. The computer program product also includes program instructions, stored on at least one of the one or more computer-readable tangible data storage media, to display, in response to the additional edits to the document, additional markers, in or proximate to the frame element, indicating where the positions of the additional edits are with reference to the entirety of the document, wherein each of the additional markers are visually distinct from each other. The computer program product also includes program instructions, stored on at least one of the one or more computer-readable tangible data storage media, to remove the first marker in response to the nth edit to the document.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 depicts a screenshot of a text editing application interface with an example position tracking interface with another additional feature as it may be displayed on a computing device display screen.

FIG. 4 depicts a screenshot of a text editing application interface with another example position tracking interface as it may be displayed on a computing device display screen.

DETAILED DESCRIPTION

There are set forth herein examples of a method, computing system, and computer program product for providing a position tracking interface on a computing device or in a computing environment. Various embodiments disclosed herein may help a user keep track of the positions within the document where the user has made edits or has spent time viewing the document, among various other features and advantages. Various illustrative features and advantages of a position tracking interface system are further described below with reference to FIGS. 1-7.

Figure 1:
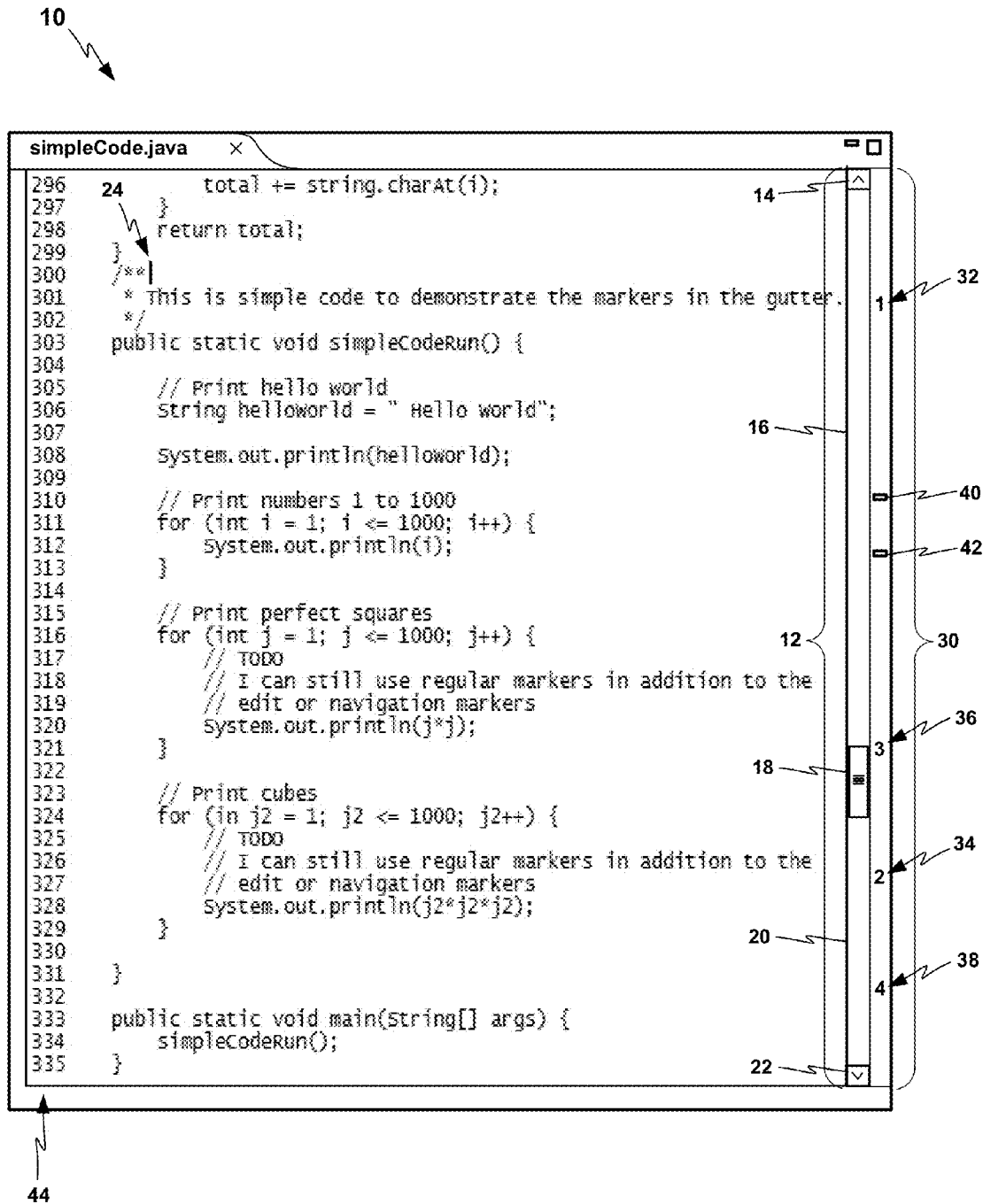
FIG. 1 depicts a screenshot of a text editing application interface with an example position tracking interface as it may be displayed on a computing device display screen.

FIG. 1 depicts a screenshot of a text editor application interface 10 with an example position tracking interface 30 as it may be displayed on a computing device display screen. Text editor application interface 10 is for a text editor application, as an example of a document editing application; in this case, a document editing application specialized for editing computer programming source code. As FIG. 1 shows, text editor application interface 10 displays lines of source code, in Java in this example, that the user may be editing. The lines of source code as displayed in FIG. 1 represent a relatively small partial view of the entirety of the source code document or file being edited.

Text editor application interface 10 also includes scrollbar 12, that the user may use to navigate back and forth through the entirety of the document being edited, and view and interact with other partial views of the document. Scrollbar 12 is one example of a frame element, or an element of the user interface frame that may be rendered as part of text editor application interface 10, or in combination with text editor application interface 10 as part of an integrated development environment (IDE), for example. Scrollbar 12 includes up arrow button 14, page up area 16, scroller thumb 18, page down area 20, and down arrow button 22. A user may navigate up and down through the document by selecting the scroller thumb 18 and moving it up and down through scrollbar 12, by selecting up arrow button 14 or down arrow button 22, or by selecting page up area 16 or page down area 20. In this example, scroller thumb 18 is proportionally sized relative to scrollbar 12 to indicate the proportion of the entirety of the document that is represented by the current partial view shown by the text editor application interface 10. Text editor application interface 10 also includes cursor 24, at the user's current position for making edits.

Text editor application interface 10 also includes position tracking interface 30 as another example of a frame element, adjacent to scrollbar 12. Position tracking interface 30 is an example of a frame element in that it also forms part of the frame of text editor application interface 10 or may be incorporated into or positioned proximate to the frame of text editor application interface 10. Scrollbar 12 and position tracking interface 30 may also be considered to form two portions of a single frame element together, that forms or is positioned at one side of the text editor application interface 10. As seen in FIG. 1, position tracking interface 30 includes markers 32, 34, 36, 38, which are transient markers in this example. In another example, markers 32, 34, 36, 38 may be displayed directly in scrollbar 12, such that scrollbar 12 and position tracking interface 30 may occupy the same space. Marker 32 is in the form of a number "1", marker 34 is in the form of a number "2", marker 32 is in the form of a number "3", and marker 32 is in the form of a number "4". Position tracking interface 30 also includes markers 40, 42 which are persistent markers, which may be formerly transient markers that the user has selected to persist. These aspects of position tracking interface 30 are further explained as follows, with respect to the example of FIG. 1. FIG. 1 also shows a line number column 44 displayed along the left side of the text editor application interface 10, which may be used in a text editor for computer programming but typically not in word processing applications, for example.

Once the user has the document open in the document editing application, a position tracking module or program may listen or watch for user activity. The position tracking module or program is a portion of software that determines what to display in position tracking interface 30, including when and where to display the markers. The position tracking module or program may be part of the document editing application, or a separate program, or a plug-in or add-on, or take any other form in the user's computing environment. It may be referred to as the "position tracking program" with the understanding that it may be a separate program, a module of the editing application, a plug-in or add-on, or a portion of software in any other form, and at any level of integration or cooperation with the document editing application that renders the text editor application interface 10.

As the user navigates through the document or makes edits to the document, which may include writing, deleting, modifying, or any other kinds of edits, the position tracking program tracks the user activity. An input indicating user activity may therefore include an edit to the document at the first position where the edit may consist of entering text, deleting text, or modifying text. For certain types of user activity, such as an edit to the document, for example, the position tracking program receives an input indicating that edit and its position in the document. Any portion of software that performs any of the functions described herein may be part of what is referred to herein as the "position tracking program".

The position tracking program then displays one of the markers in the position tracking interface 30, at a position within the span of position tracking interface 30 that indicates where the position of that corresponding edit is with reference to the entirety of the document. That is, just as the adjacent scrollbar 12 uses the position of the scrolling thumb 18 within the span of scrollbar 12 to indicate the position of the currently displayed partial view of the document relative to the entirety of the document, the position tracking interface 30 also uses corresponding positions of its markers to indicate the position of the edit corresponding to the marker relative to the entirety of the document. This then allows the user to easily see where that edit was, as she navigates away from the position where she made the edit to other portions of the document. As the user makes multiple edits in different positions, potentially throughout the document, she can easily see where each of them was, and easily return to those positions, such as by selecting the scrolling thumb 18 and moving it directly adjacent to the marker for a desired previous edit.

Markers 32, 34, 36, 38 are used in the form of numbers in the example of FIG. 1, the numbers 1-4 respectively. Position tracking interface 30 may also rotate the numbers for the markers as edits or other qualifying user activities are made, so that the user activities always have markers that are in order of how recent they are, such that the number 1 marker indicates the most recent edit made, the number 2 indicates the second most recent edit, and so forth. Then, when the user makes another edit, a new number 1 marker is placed at the position of that newest edit, the previous number 1 marker shifts to become number 2, the previous number 2 marker shifts to become number 3, and so forth. The numbers for the markers may therefore be modified as additional markers are added, such that a first number always represents a position of a most recent user activity, a second number always represents a position of a second most recent user activity, and so forth. This is an optional variation, and in another variation, each of the markers may always stay the same. Additional markers besides numbers may also be used, such as letters, shapes, patterns, or features with color, so that a first marker and a second marker are different colored markers, or are different shapes, etc. Some or all of the markers may also be visually identical instead of each being different. Any of these options may be selectable by user configuration, or any one of them may be a default with options to select one of the other types of markers.

The number of markers to use at one time may also be user-selectable. It may be five, or ten, or twenty, or 100, or whatever other number a user selects, and may or may not have a maximum allowed. The position tracking module or program may also allow for multiple edits to be made with the same line or same small set of lines within a threshold, or within the same partial view of the document that can be displayed at one time, and still maintain just a single marker for that position within the document, rather than adding multiple markers on top of each other in the position tracking interface 30.

In this example, the position tracking program posts markers to the position tracking interface 30 substantially in real-time as the user makes edits to the document. That is, the position tracking program actively watches the user's activity in the document editing application, such as by listening for events corresponding to the user inputs, and processes or evaluates any qualifying activity and posts markers in the position tracking interface 30 while the user is editing or navigating through the document, rather than needing to wait for the user to save or close the file for the document or take any other manual step. The position tracking program may post markers to the position tracking interface 30 with little to no human-perceptible delay as the user edits and navigates through the document. This may provide the user with valuable position tracking in real-time as the user is editing and navigating through the document.

As noted above, the position tracking program may use a set number of markers at a time. As the user continues to make edits in new positions in the document and as the position tracking program continues to post new markers in the position tracking interface 30, the position tracking program may begin to remove markers, beginning with the oldest or stalest first. (A given marker may be the stalest without being the oldest, if the user has returned to the position of the oldest marker and made more recent edits there, while another marker may correspond to the oldest edit, making it the stalest marker.) This way, if the user is skipping back and forth between a number of different positions but has other positions she edited earlier but has not visited in some time, the position tracking program is removes them to keep from distracting the user from the markers of current interest and to keep from cluttering up the position tracking interface 30 with markers for positions the user is no longer currently interested in.

The position tracking program may enable the user to select an option for the maximum number of markers to use at any one time, or an option for a maximum length of time without returning to the marker's position before removing the marker, in different examples. The position tracking program may store the markers, so that even if a user saves and closes the document and opens it again days or weeks later, the markers for the user's most recent activity are displayed again in the same positions as when the user last left off her activity. The markers may therefore immediately remind the user of where in the document she had last been making edits or spending time viewing, and therefore help remind the user of what she had been doing in the document the last time she was working on it.

While a text editor application interface 10 for a text editor application specialized for editing computer programming source code is illustratively depicted in FIG. 1, the aspects of this disclosure are equally applicable to any kind of document editing application, which may include a text editor application, a word processing application, a presentations application, a spreadsheet application, a desktop publishing application, a scientific publishing application, or any other kind of application that enables a user to write, create, or edit content in a document file of any kind. This may include a text editor application used to edit files of computer program source code in Java, Python, C, HTML, XML, or any other programming language or markup language. This may also include a word processing application used to edit legal documents, reference material, books, or any other word processing document. This may also include any kind of application that enables editing spreadsheets, slide decks or other presentations, desktop publishing documents, or scientific publishing documents, for example.

Whatever kind of document editing application is applicable, it may enable editing documents that are too long to display in their entirety on a computer screen at one time, such that it displays partial views of the document at any one time, and is navigable among different partial views of the document. That is, the document editing application enables the user to navigate among different partial views of the document, such as by using any of the features of a scrollbar such as scrollbar 12 as shown in FIG. 1. The document editing application includes scrollbar 12, or some other interface frame element, that indicates where a presently displayed partial view of the document is with reference to an entirety of the document. The position tracking program that displays position tracking interface 30 is then enabled to receive a first input indicating user activity at a first position in a document in a document editing application, and display, in response to the first input indicating user activity, a first marker, in or proximate to the scrollbar 12 or other frame element, indicating where the first position is with reference to the entirety of the document. In the example of FIG. 1, the position tracking program displays position tracking interface 30 as a frame element immediately proximate to, or adjacent to, the frame element of scrollbar 12. In other examples, position tracking interface 30 may be superimposed directly in or on top of scrollbar 12, or displayed in some other position in or adjacent to or nearby scrollbar 12.

The position tracking program may continue receiving a second input, a third input, and so forth to an nth input, indicating user activity at a second position, a third position, an nth position, etc. in the document in the document editing application. The position tracking program may display, in response to the second input, third input, nth input, etc. indicating user activity, a second marker, a third marker, an nth marker, etc. in or proximate to the frame element, such as in position tracking interface 30, indicating where the second position, the third position, the nth position, etc. are with reference to the entirety of the document. The second marker may be visually distinct from the first marker, the nth marker may be visually distinct from the second marker, etc. Once a certain number of markers are being displayed, the position tracking program may remove the first marker at or at about the same time that it begins displaying the nth marker. The first marker, second marker, nth marker, etc. for purposes of this discussion may continue to refer to the markers at the same positions where they are placed even if the markers are selected to change into different forms, such as different numbers, as subsequent markers are displayed. A marker may change into a representation as a different number or other kind of different form, but still be considered the same marker, marking the same position, for purposes of this disclosure.

As indicated above, the position tracking program may also provide an option for the user to select how many n markers to display at the same time before removing old markers when adding new markers. Also as indicated above, the position tracking program may, by default, remove the first marker after a certain number of subsequent markers are displayed, but also provide a user option to make the first marker persist regardless of a number of subsequent markers that are displayed. The markers selected to persist may be changed into a different form than the continuum of numbers or whatever other form is being used to display the transient markers, such as is depicted in FIG. 1 with the markers 40, 42 displayed in the form of blocks instead of in the form of numbers.

Figure 2:
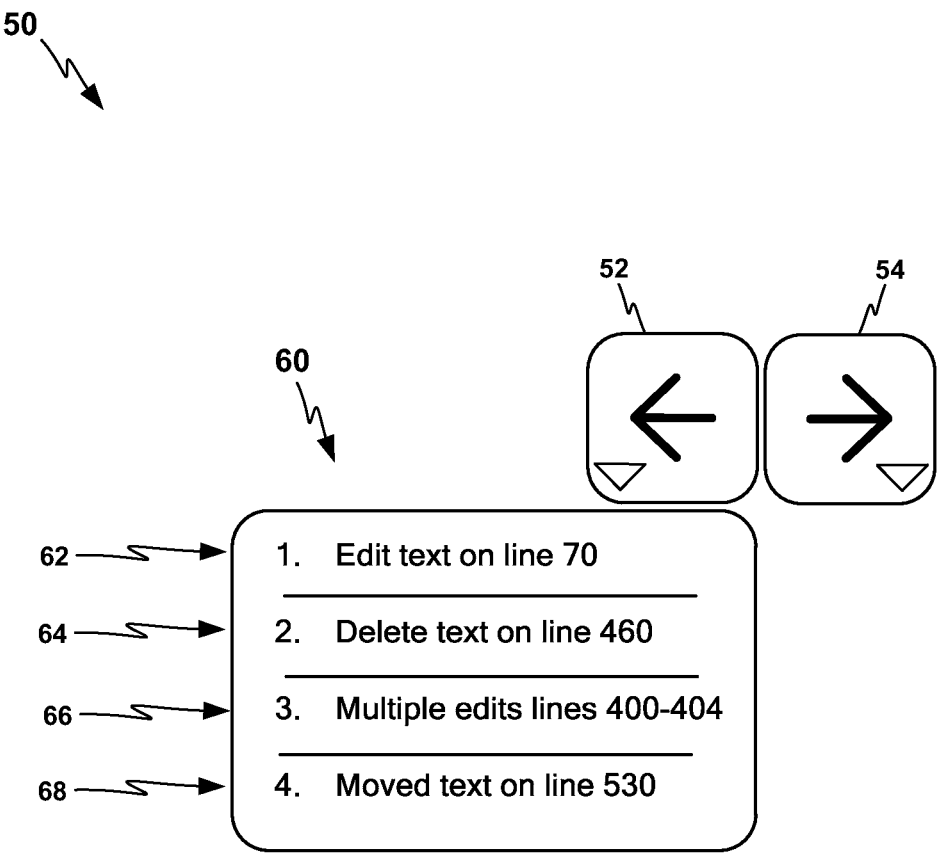
FIG. 2 depicts a partial screenshot of an example of an additional feature for a position tracking interface as it may be displayed on a computing device display screen.

FIG. 2 depicts a partial screenshot of an example of an additional feature for a position tracking interface as it may be displayed on a computing device display screen. Navigation buttons 52, 54 may form part of a menu displayed in a frame element around the periphery of the interface for the document editing application. The navigation buttons 52, 54 may be in any positions in the frame elements or user interface elements in or surrounding the document editing application, and their positions may be user-configurable. Navigation buttons 52, 54 are for going backward and forward through a stored history of user edits, i.e., for implementing "undo" and "redo" functions in the document editing, for undoing and restoring user edits. They may also enable a user to select them to display a history of the recent edits, as shown in edit history listing 60, which in this example displays the four most recent edit positions in edit history line items 62, 64, 66, 68, making reference to line numbers from the line number column 44 as shown in FIG. 1. The functionality of the navigation buttons 52, 54 and/or edit history listing 60 may also be reproduced directly on the markers, as depicted in FIG. 3.

In various examples, therefore, the position tracking program (potentially in cooperation with features of the document editing application) may record a first automatic annotation of the edit to the document at the first position, such as the annotation in edit history line item 64 corresponding to an edit made at the position indicated by marker 34, and a second automatic annotation of the edit to the document at the second position, such as the annotation in edit history line item 62 corresponding to an edit made at the position indicated by marker 32. The position tracking program and/or features of the document editing application may then display history list 60 that includes the first automatic annotation, at edit history line item 64, and the second automatic annotation, at edit history line item 64. The position tracking program and/or features of the document editing application may then receive a user input indicating selection of either the first automatic annotation or the second automatic annotation from the history list 60, and display, in response to the user input selecting one of the automatic annotations, a partial view of the document showing either the first position or the second position based on whether the user input indicates selection of the first automatic annotation or the second automatic annotation.

In this example, if the user selects the annotation at edit history line item 64, the position tracking program may automatically navigate to the position of line 460 in the document, where the user had deleted some text, as indicated in the annotation and as corresponds to the position of marker 34, and display a partial view of the document in text editor application interface 10 that shows line 460. If the user selects the annotation at edit history line item 62, the position tracking program may automatically navigate to the position of line 70 in the document, where the user had edited some text, as indicated in the annotation and as corresponds to the position of marker 32, and display a partial view of the document in text editor application interface 10 that shows line 70.

FIG. 3 depicts a screenshot of a text editing application interface 10B with example position tracking interface 30 with another additional feature, edit history pop-over 72, as it may be displayed on a computing device display screen. The user may select one of the markers, e.g. marker 32, such as by hovering a pointer 70 over the marker 32 as depicted in this example. In other examples, the user may select one of the markers by clicking on it or right-clicking on it in a mouse-based computing environment, or by directly touching or pinching the marker on a touchscreen, for example.

In this example, when the user selects the marker in the appropriate way, the position tracking program displays additional information about the marker and/or its corresponding edit or other user activity, such as the edit history pop-over 72. In this example, edit history pop-over 72 shows the type of edit and the line number on which it was made, for the user activity represented by marker 32. In this example, edit history pop-over 72 shows the same information as edit history line item 62 from edit history listing 60 as shown in FIG. 2. The user may likewise be able to select any of the other transient markers 34, 36, 38, and get the similar information about their corresponding edits, which in this example may similarly correspond to the edit history line items 64, 66, 68 respectively, as shown in edit history listing 60 in FIG. 2. In other examples, additional information may be displayed in the pop-over when the user hovers a mouse over or otherwise selects a marker. For example, a pop-over may display a context menu that also shows the text before and after an edit to illustrate the change.

For other types of document editing applications such as a word processing application, a spreadsheet application, or a presentations or slides application, a position tracking program may respond to analogous user selections of markers by displaying various types of information, such as the type of user activity and the page number, paragraph number, row number, row and column number, or slide number of the user activity, for example. In whatever kind of document editing application, the position tracking program may therefore record an automatic annotation of the edit to the document at a first position, receive a user input selecting the first marker, and display, in response to the user input selecting the first marker, the automatic annotation of the edit to the document at the first position.

Markers may be applied to any type of user activity at an ascertainable position in a document, in different examples, so that the user activity may apply not only to adding, modifying, deleting, or otherwise making edits to content, but also to other forms of user activity. For example, markers may be applied in response to a user activity of the user merely navigating to a certain position in the document and remaining with a certain position displayed in the partial view depicted on a device display screen. The position tracking program may also optionally add a marker only if the user remains with a certain position displayed in the partial view on the screen for at least a certain minimum threshold of time. That is, an input indicating user activity may include an edit to the document at a first position, and/or a navigation to a first position followed by keeping the first position in a currently displayed view for at least a selected threshold of time, in different examples. The details of types of user activities tracked by markers may also be user-selectable options, so a user could select to only add markers for positions where the user makes edits, or only add markers where the user navigates to the position and remains with that position open in the partial view of the document on the screen for a minimum threshold length of time, or add markers for either of these types of user activities.

The position tracking program may also enable shortcut keys that work together with the markers, so that a user can navigate to the position indicated by one of the markers just by hitting one of the shortcut keys. The shortcut keys may be enabled with the function keys, or by holding another key such as the "shift" key or the "alt" key while tapping one of the ordinary number keys on a keyboard, or be enabled in other ways in various examples. So, for example, the user may enter "shift-1" by pressing both the "shift" key and the number "1" key at the same time to navigate directly to the position indicated by the marker currently in the form of the number "1", e.g. marker 32 in the view of FIGS. 1 and 3. The shortcut keys may include a first shortcut key associated with the first marker, a second shortcut key associated with the second marker, and so forth. The position tracking program may then display, in response to a user input indicating selection of one of the shortcut keys, a partial view of the document showing either the first position, the second position, and so forth based on whether the user input indicates selection of the first shortcut key or the second shortcut key.

The position tracking program may also track inputs from multiple users and indicate with the markers which of the users was behind the user activity indicated by that marker. This may be used for a document that is editing by different users at different times, or for a document that is hosted by one computing device, such as a server, and has multiple users editing it potentially simultaneously from different computing devices. For example, the position tracking program may display markers for user activity from a first user in the form of "A1", "A2", "A3", etc., while displaying markers for user activity from a second user in the form of "B1", "B2", "B3", etc.

In this example, where one or more inputs and corresponding markers are associated with a first user, the position tracking program may receive one or more additional inputs indicating user activity at one or more positions in the document in the document editing application, wherein the one or more additional inputs are associated with a second user. The position tracking program may then display, in response to the one or more additional inputs indicating user activity, one or more additional markers, in or proximate to the frame element, indicating where the one or more positions of the one or more additional inputs are with reference to the entirety of the document, such that the one or more additional markers for the inputs associated with the second user are visually distinct from the first marker associated with the first user. This may be with different letters, as described above, or with a series of numbers in a different range, or numbers displayed in a different color from those of the markers for the first user, or different shapes with different colors, or any other kind of distinguishing feature. Further distinguishing features may be used for a third, fourth, or any number of additional users. In another example, the markers for two or more users may be displayed within a common sequence, without distinguishing markers for edits or other types of user activity from different users.

In another example, the position tracking program may display markers in a continuous form instead of in a discrete form, such as in the form of a "heat map" display instead of in the form of discrete, individual numbers or shapes. This heat map marker format is depicted in FIG. 4.

FIG. 4 depicts a screenshot of a text editing application interface 10C with another example position tracking interface 74, i.e. the heat map type frame element running along the right-hand side of the text editing application interface 10C adjacent to scrollbar 12, as it may be displayed on a computing device display screen. In this example, the position tracking program displays markers in the form of changes in color or shade along the heat map position tracking interface 74. As a user engages in more and more user activity at a certain position within a document, such as making more and more edits or simply spending more and more time navigating through or viewing a certain position, the position tracking program incrementally changes how the marker for that position is displayed by incrementally changing the color or shade of that position of the heat map position tracking interface 74. For example, the position tracking program may make a corresponding position on heat map position tracking interface 74 progressively a lighter and lighter shade from black to white, or a progressively different color starting from black and moving through dark red, bright red, orange, yellow, white, and blue, for example. Any variable range of appearances may be used for a heat map position tracking interface 74.

In the example of FIG. 4, heat map position tracking interface 74 uses variations in shade from a default black, indicating no recorded user activity at the corresponding positions, to lighter and lighter shades of gray up to white, to indicate progressively more user activity at a corresponding position. Heat map position tracking interface 74 shows marker 75 as a large white area, indicating a high level of recorded user activity in the corresponding position. Heat map position tracking interface 74 also shows marker 76 as a light gray area, indicating a moderate level of recorded user activity in the corresponding position, as well as dark gray areas 77, 78, 79, which may indicate one or a few recorded user activities in those corresponding positions.

Therefore, in this example, a first marker may include a change in a color or a shade in or proximate to a frame element, such as heat map position tracking interface 74, at a frame element position, i.e. the position along heat map position tracking interface 74, that corresponds to a first position of a first user activity. A position tracking program may then receive additional inputs indicating user activity at the first position in the document in the document editing application, and display, in response to the additional inputs indicating user activity at the first position, cumulative changes in the color or the shade in or proximate to heat map position tracking interface 74 at the frame element position that corresponds to the first position.

Position tracking interface 30 may be implemented in any of a wide variety of types of software, including as a web application provided from a web server in a browser running on another computing device, or as a stand-alone desktop application or mobile application, for example. In one example, position tracking interface 30 may be implemented in Java, and run on the user's computing device, or be provided by a server for a website and that runs in a browser on a separate computing device. In another example, position tracking interface 30 may be implemented as a web application using JavaScript, that may run on a server and provide an interface in a browser on a client computing device. The web application may use a server-side JavaScript implementation, for example. In other examples, the web application may be written in Python, Ruby, Clojure, or any other language. An illustrative computing environment for these implementations is depicted in FIG. 5.

Figure 5:
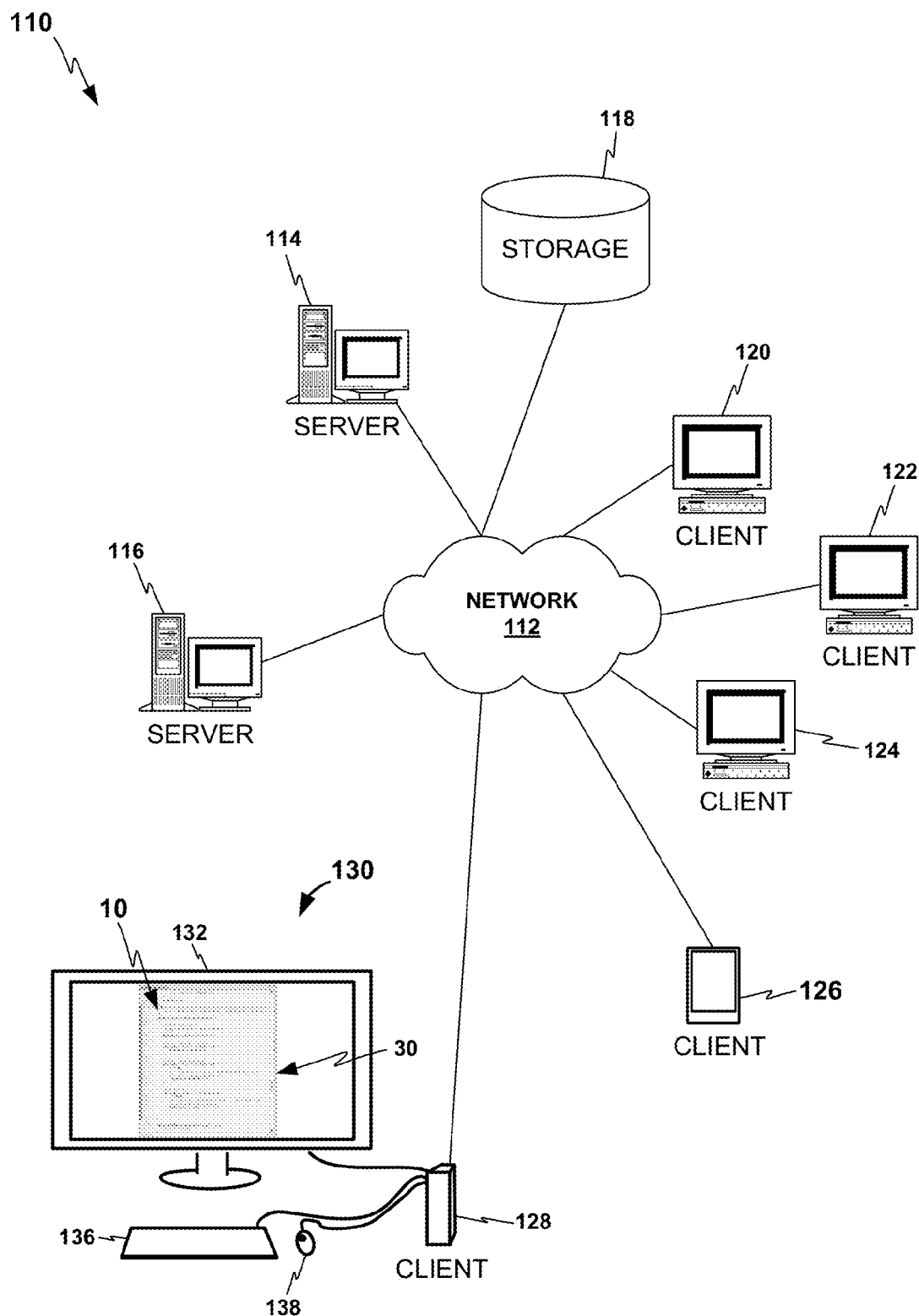
FIG. 5 is a block diagram of an example computing network environment in which a server may provide a position tracking interface to client computing devices.

FIG. 5 is a block diagram of a computing network environment 110 in which a position tracking program and a position tracking interface 30 may be used, according to an illustrative example. FIG. 5 depicts a representation of a network of computer systems including one or more computing devices that implement, execute, or embody a position tracking interface program, and provide a position tracking interface 30 or 74 such as is depicted in and described with reference to FIGS. 1-4 (including in its specific states 10, 10B, 10C as depicted in each of FIGS. 1, 3, and 4).

Computing environment 110 includes network 112, that may include one or more networks of any kind that may provide communications links between various devices and computers connected together within computing environment 110. Network 112 may include connections, such as wire, wireless communication links, or fiber optic cables. In the depicted example, server 114, server 116, and storage unit 118 connect to network 112. In one example, network 112 is the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 112 may also be implemented as a number of different types of networks, such as for example, an intranet, a local area network (LAN), or a wide area network (WAN). FIG. 5 is an illustrative example, and not an architectural limitation for the variety of illustrative examples.

Servers 114 and 116 may include any type of servers, and storage unit 118 may include any type of storage server, storage area network, redundant array of independent discs (RAID), storage device, cloud storage service, or any other type of data storage. In addition, clients 120, 122, 124, 126, and 128 connect to network 112, through any type of wireless and/or hard-line network components or infrastructure. Clients 120, 122, 124, 126, and 128 may be, for example, personal computers, laptop computers, tablet computers, smartphones, or other computing devices. In the depicted example, server 114 may provide any kind of data, including website content, web applications, a web application interface, or downloaded desktop applications to clients 120, 122, 124, 126, and 128. Clients 120, 122, 124, 126, and 128 are computing devices that are clients to server 114 in this example. Computing environment 110 may include additional servers, clients, storage elements, network elements, and various other devices not shown in FIG. 5.

Client computing device 128 is associated with an illustrative personal computing environment 130, as depicted in FIG. 3A, with computing device 128 being connected to network 112, and capable of establishing a network connection to servers 114 and 116 through network 112 and sending requests to servers 114 and 116. Computing environment 130 in this example also includes user input devices in the form of keyboard 136, mouse 138, and monitor 132 rendering a window displaying position tracking interface 30, as shown in FIGS. 1-4. Client computing device 128 may run a web browser and receive web application data for a position tracking program web application running on server 114 or server 116, for example. Client computing device 128 may render the corresponding position tracking program and position tracking interface 30 in a browser window of a web browser program being rendered on the display screen of monitor 132, in this example. The web browser program running on computing device 128 may provide a runtime for the web application interface. For example, the position tracking interface 30 may be written in Java, or any other language that compiles to Java bytecode such as Jython, JRuby, or Clojure, and the web browser program running on computing device 128 may include a Java Virtual Machine (JVM) or a Java plugin for executing JVM-compatible bytecode. As another example, the position tracking interface web application may be written at least in part in JavaScript, and the browser may include capability for running JavaScript, for example.

Figure 6:
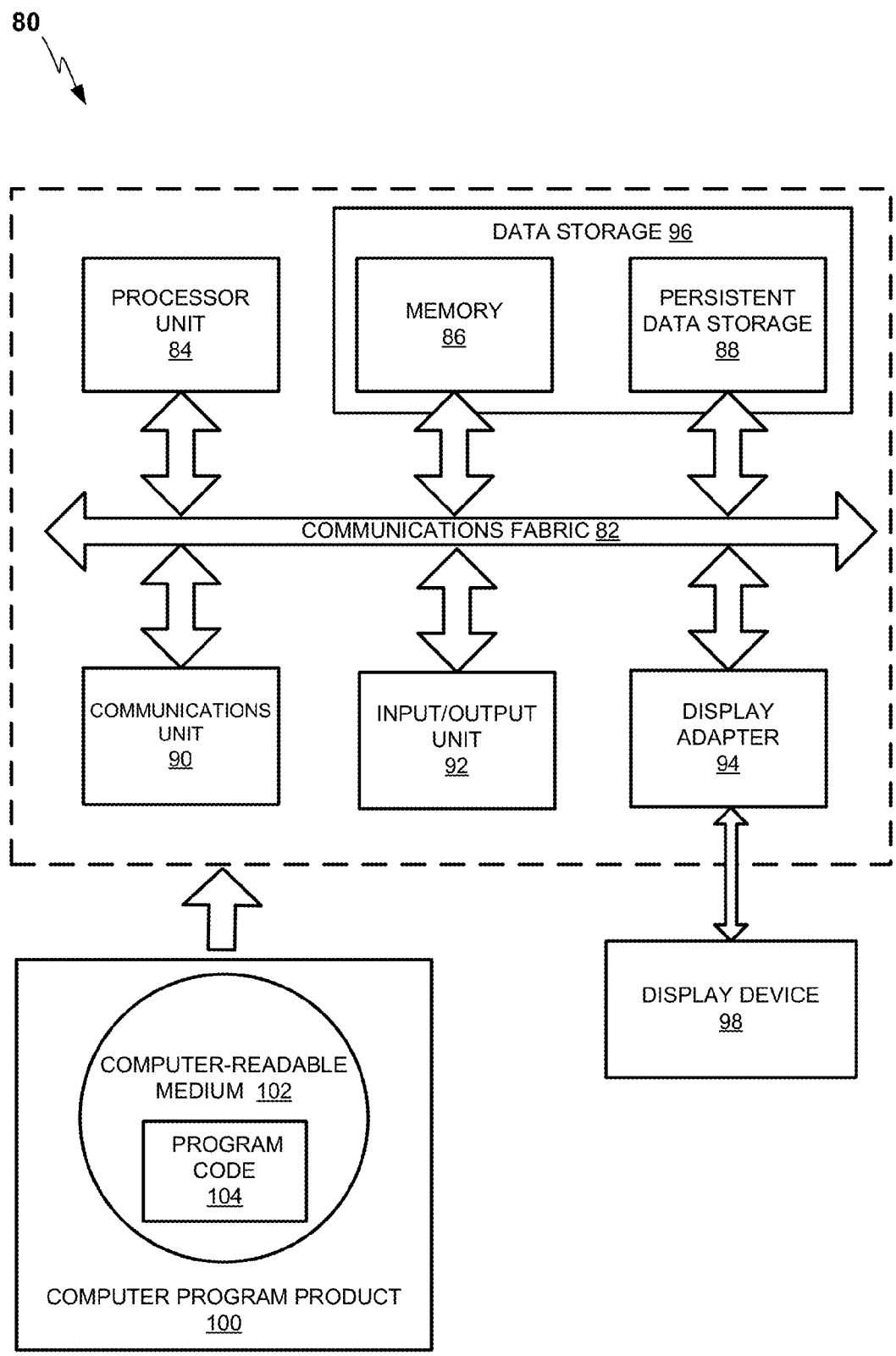
FIG. 6 is a block diagram of an example computing device that may run a position tracking interface program.

FIG. 6 is a block diagram of a computing device 80 that may be used to run a text editor program, word processing program, or other program that enables writing, creating, and/or editing a document, and that may be enabled to provide a position tracking interface 30, according to an illustrative example. The text editor program, word processing program, or other program may be enabled to provide position tracking interface 30 either by incorporating this capability natively, or adding it via a plug-in, add-on, or macro, or by running a separate program that modifies the appearance of the text editor or word processing program, for example. Computing device 80 may be a workstation, server, mainframe computer, notebook or laptop computer, desktop computer, tablet, smartphone, feature phone, or other programmable data processing apparatus of any kind. Computing device 80 of FIG. 6 may represent any of servers 114, 116 or client computing devices 120, 122, 124, 126, and 128 as depicted in FIG. 5, for example. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a position tracking interface module that tracks user activity in a document and provides a position tracking interface 30, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including monitor 132 of FIG. 5. It will be understood that some of these examples may overlap with example components of communications unit 90 or input/output unit 92. Input/output unit 92 may also include appropriate device drivers for any type of external device, or such device drivers may reside in the operating system or elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a position tracking interface computer program, module, or portion of code for providing a position tracking interface 30 as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

Figure 7:
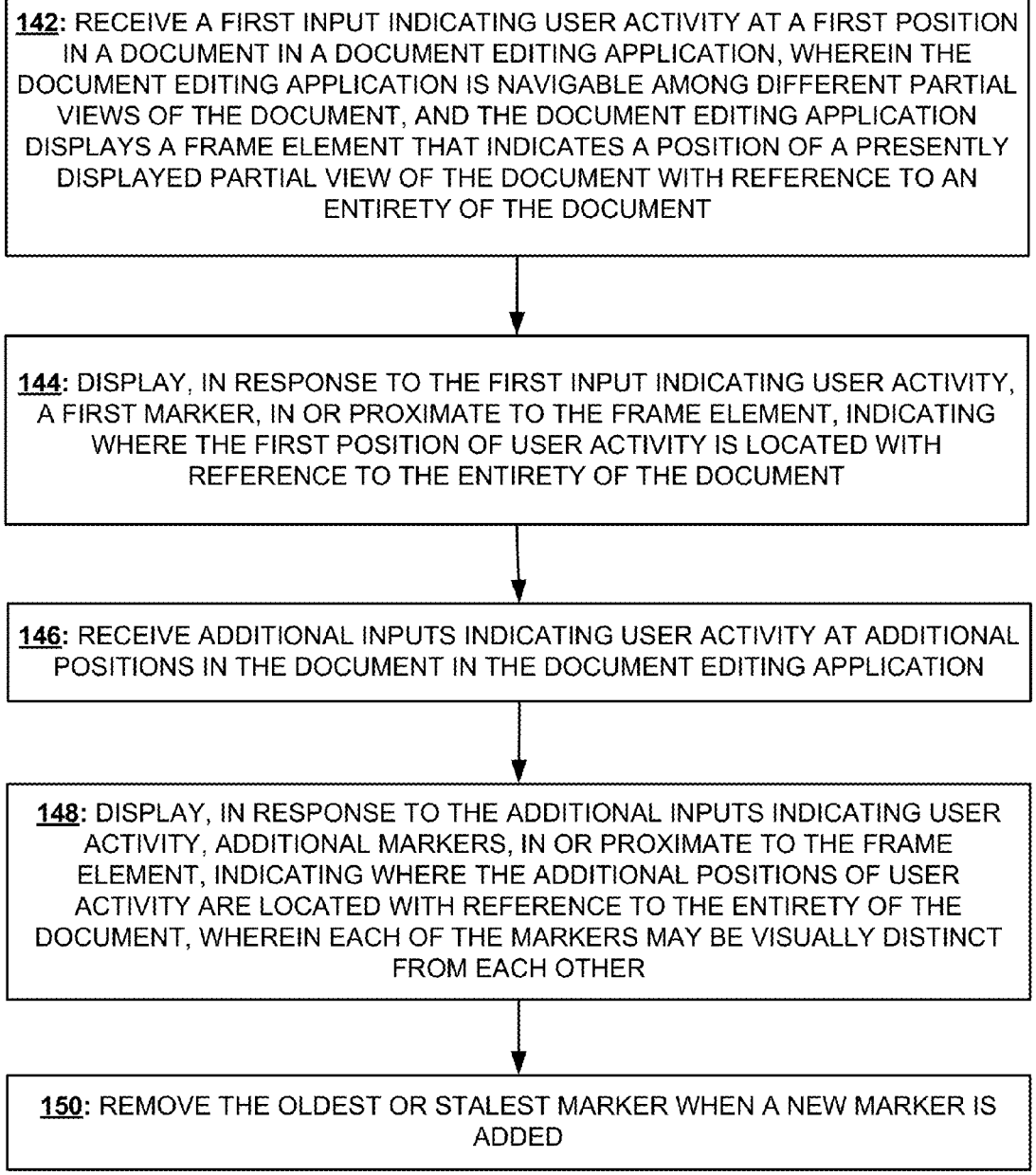
FIG. 7 is a flowchart illustrating operation of an example method for a position tracking interface.

FIG. 7 is a flowchart illustrating operation of an example method 140 for a computing device, such as any of the computing devices depicted in FIGS. 5 and 6, to provide a position tracking interface 30 such as is depicted in FIGS. 1-4. In method 140, a computing device receives a first input indicating user activity at a first position in a document in a document editing application, wherein the document editing application is navigable among different partial views of the document, and the document editing application comprises an interface frame element that indicates where a presently displayed partial view of the document is with reference to an entirety of the document (142). The computing device then displays, in response to the first input indicating user activity, a first marker, in or proximate to the frame element, indicating where the first position is with reference to the entirety of the document (144). The computing device may continue to receive additional inputs indicating user activity at additional positions in the document in the document editing application (146), and display, in response to the additional inputs indicating user activity, additional markers, in or proximate to the frame element, indicating where the additional positions are with reference to the entirety of the document, wherein each of the markers may be visually distinct from each other (148). After a certain number of markers are displayed at one time, the computing device may begin to remove the oldest or stalest marker when it adds a new marker (150).

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:

receiving, by one or more processors, a first input indicating user activity that comprises a first edit to a document at a first position in the document in a document editing application executing on a computing device, wherein the document editing application is navigable among different partial views of the document, and the document editing application displays a frame element that indicates a position of a presently displayed partial view of the document with reference to an entirety of the document; and displaying, by the one or more processors, in response to the first input indicating the user activity that comprises the first edit to the document, a first marker, in or proximate to the frame element, indicating where the first position of user activity is located with reference to the entirety of the document, wherein the first marker is separate from the first edit to the document;

receiving, by the one or more processors, a second input indicating user activity that comprises a second edit to the document at a second position in the document in the document editing application;

displaying, in response to the second input indicating the user activity that comprises the second edit to the document, a second marker, in or proximate to the frame element, indicating where the second position of user activity is located with reference to the entirety of the document, wherein the second marker is separate from the second edit to the document and is visually distinct from the first marker, wherein the first marker and the second marker are different numbers, and wherein the numbers for the markers are modified as additional markers are added, such that a first number always represents a position of a most recent user activity, and a second number always represents a position of a second most recent user activity.

2. The method of claim 1, further comprising:

receiving an nth input indicating user activity that comprises an nth edit to the document at an nth position in the document in the document editing application;

displaying, in response to the nth input indicating the user activity that comprises the nth edit to the document, an nth marker, in or proximate to the frame element, indicating where the nth position of user activity is located with reference to the entirety of the document, wherein the nth marker is separate from the nth edit to the document and is visually distinct from the second marker; and removing the first marker.

3. The method of claim 2, further comprising providing an option for the user to select how many n markers to display at the same time before removing old markers when adding new markers.

4. The method of claim 1, wherein the first marker and the second marker are different colored markers.

5. The method of claim 1, wherein the first marker and the second marker are different shapes.

6. The method of claim 1, further comprising:

recording a first automatic annotation of the edit to the document at the first position and a second automatic annotation of the edit to the document at the second position;

displaying a history list comprising the first automatic annotation and the second automatic annotation;

receiving a user input indicating selection of either the first automatic annotation or the second automatic annotation from the history list; and displaying, in response to the user input selecting one of the automatic annotations, a partial view of the document showing either the first position or the second position based on whether the user input indicates selection of the first automatic annotation or the second automatic annotation.

7. The method of claim 1, further comprising:

enabling shortcut keys comprising a first shortcut key associated with the first marker and a second shortcut key associated with the second marker; and displaying, in response to a user input indicating selection of one of the shortcut keys, a partial view of the document showing either the first position of user activity or the second position of user activity based on whether the user input indicates selection of the first shortcut key or the second shortcut key.

8. The method of claim 1, wherein the first input indicating user activity comprises an edit to the document at the first position, or a navigation to the first position followed by keeping the first position in a currently displayed view for at least a selected threshold of time.

9. The method of claim 1, wherein the first edit to the document at the first position consists of entering text, deleting text, or modifying text.

10. The method of claim 1, further comprising:

recording an automatic annotation of the edit to the document at the first position of user activity;

receiving a user input selecting the first marker; and displaying, in response to the user input selecting the first marker, the automatic annotation of the edit to the document at the first position of user activity.

11. The method of claim 1, wherein by default, the first marker is removed after a certain number of subsequent markers are displayed, the method further comprising:

providing a user option to make the first marker persist regardless of a number of subsequent markers that are displayed.

12. The method of claim 1, wherein the first input and the first marker are associated with a first user, the method further comprising:

receiving one or more additional inputs indicating user activity at one or more positions in the document in the document editing application, wherein the one or more additional inputs are associated with a second user; and displaying, in response to the one or more additional inputs indicating user activity, one or more additional markers, in or proximate to the frame element, indicating where the one or more positions of the one or more additional inputs are with reference to the entirety of the document, wherein the one or more additional markers for the inputs associated with the second user are visually distinct from the first marker associated with the first user.

13. The method of claim 1, wherein the first marker comprises a change in a color or a shade in or proximate to the frame element at a frame element position that corresponds to the first position, the method further comprising:

receiving additional inputs indicating user activity at the first position of user activity in the document in the document editing application; and displaying, in response to the additional inputs indicating user activity at the first position of user activity, cumulative changes in the color or the shade in or proximate to the frame element at the frame element position that corresponds to the first position.

14. The method of claim 1, wherein the frame element is a first frame element, the method further comprising:
displaying a second frame element proximate to the first frame element;
wherein displaying the first marker in or proximate to the first frame element further comprises displaying the first marker in the second frame element.

15. A computing system comprising:
one or more processors;
one or more computer-readable tangible non-transitory storage devices;
a display device;
program instructions, stored on at least one of the one or more computer-readable tangible storage devices for execution by at least one of the one or more processors, to receive a first edit to the document at a first position in a document in a document editing application, wherein the document editing application is navigable among different partial views of the document, and the document editing application displays a frame element that indicates a position of a presently displayed partial view of the document on the display device with reference to an entirety of the document;
program instructions, stored on at least one of the one or more computer-readable tangible storage devices for execution by at least one of the one or more processors, to display on the display device, in response to the first edit to the document, a first marker, in or proximate to the frame element, indicating where the first position of the first edit is located with reference to the entirety of the document, wherein the first marker is separate from the first edit to the document;
program instructions, stored on at least one of the one or more computer-readable tangible storage devices for execution by at least one of the one or more processors, to receive additional edits to the document including an nth edit to the document, wherein each of the additional edits is at an additional position in the document in the document editing application;
program instructions, stored on at least one of the one or more computer-readable tangible storage devices for execution by at least one of the one or more processors, to display, in response to the additional edits to the document, additional markers, in or proximate to the frame element on the display device, indicating where the additional positions of the additional edits are located with reference to the entirety of the document, wherein each of the additional markers are separate from the additional edits to the document and are visually distinct from each other, wherein the first marker and the second marker are different numbers, and wherein the numbers for the markers are modified as additional markers are added, such that a first number always represents a position of a most recent user activity, and a second number always represents a position of a second most recent user activity; and
program instructions, stored on at least one of the one or more computer-readable tangible storage devices for execution by at least one of the one or more processors, to remove the first marker in response to the nth edit to the document.

16. The computing system of claim 15, further comprising:
program instructions, stored on at least one of the one or more computer-readable tangible storage devices for execution by at least one of the one or more processors, to record a first automatic annotation for the first edit to the document at the first position of the first edit and additional automatic annotations for the additional edits to the document at the additional positions of each of the additional edits to the document;
program instructions, stored on at least one of the one or more computer-readable tangible storage devices for execution by at least one of the one or more processors, to display on the display device a history list comprising the first automatic annotation and the additional automatic annotations;
program instructions, stored on at least one of the one or more computer-readable tangible storage devices for execution by at least one of the one or more processors, to receive a user input selecting first automatic annotation or any one of the additional automatic annotations from the history list; and
program instructions, stored on at least one of the one or more computer-readable tangible storage devices for execution by at least one of the one or more processors, to display on the display device, in response to the user input selecting one of the automatic annotations, a partial view of the document showing either the first position of the first edit or the additional position of one of the additional edits based on the user input selecting either the first automatic annotation or one of the additional automatic annotations.

17. A computer program product comprising:
a non-transitory storage device comprising one or more computer-readable tangible data storage media;
program instructions, stored on at least one of the one or more computer-readable tangible data storage media, to receive a first edit to the document at a first position in a document in a document editing application, wherein the document editing application is navigable among different partial views of the document, and the document editing application displays a frame element that indicates a position of a presently displayed partial view of the document with reference to an entirety of the document;
program instructions, stored on at least one of the one or more computer-readable tangible data storage media, to display, in response to the first edit to the document, a first marker, in or proximate to the frame element, indicating where the first position of user activity is located with reference to the entirety of the document, wherein the first marker is separate from the first edit to the document;
program instructions, stored on at least one of the one or more computer-readable tangible data storage media, to receive additional edits to the document including an nth edit to the document, wherein each of the additional edits is at an additional position in the document in the document editing application;
program instructions, stored on at least one of the one or more computer-readable tangible data storage media, to display, in response to the additional edits to the document, additional markers, in or proximate to the frame element, indicating where the positions of the additional edits are with reference to the entirety of the document, wherein each of the additional markers are separate from the additional edits to the document and are visually distinct from each other, wherein the first marker and the second marker are different numbers, and wherein the numbers for the markers are modified as additional markers are added, such that a first number always represents a position of a most recent user activity, and a second number always represents a position of a second most recent user activity; and program instructions, stored on at least one of the one or more computer-readable tangible data storage media, to remove the first marker in response to the nth edit to the document.

\* \* \* \* \*